US011176342B2

(12) United States Patent
Gao

(10) Patent No.: US 11,176,342 B2
(45) Date of Patent: Nov. 16, 2021

(54) PRODUCE OR ITEM RECOGNITION BY HYBRID 3D CAMERA AND/OR MULTI-SPECTRUM ILLUMINATION

(71) Applicant: Datalogic USA Inc., Eugene, OR (US)

(72) Inventor: WenLiang Gao, Eugene, OR (US)

(73) Assignee: Datalogic USA Inc., Eugene, OR (US)

( * ) Notice: Subject to any disclaimer, the term of this patent is extended or adjusted under 35 U.S.C. 154(b) by 0 days.

(21) Appl. No.: 16/744,006

(22) Filed: Jan. 15, 2020

(65) Prior Publication Data

US 2021/0216729 A1    Jul. 15, 2021

(51) Int. Cl.
*G06K 7/10* (2006.01)
*G06K 7/14* (2006.01)
*G06K 7/12* (2006.01)

(52) U.S. Cl.
CPC ......... *G06K 7/1092* (2013.01); *G06K 7/1096* (2013.01); *G06K 7/10732* (2013.01); *G06K 7/12* (2013.01); *G06K 7/1478* (2013.01)

(58) Field of Classification Search
None
See application file for complete search history.

(56) References Cited

U.S. PATENT DOCUMENTS

| | | | |
|---|---|---|---|
| 6,722,569 B2 | 4/2004 | Ehrhart et al. | |
| 7,195,164 B2 | 3/2007 | Patel | |
| 7,946,484 B2 | 5/2011 | Patel et al. | |
| 8,752,768 B2 | 6/2014 | Gao | |
| 8,800,874 B2 | 8/2014 | Gao | |
| 9,004,359 B2 | 4/2015 | Shearin et al. | |
| 9,218,516 B2 | 12/2015 | Thompson et al. | |
| 9,538,081 B1* | 1/2017 | Zhou | H04N 13/25 |
| 10,049,247 B2 | 8/2018 | Gao | |
| 10,248,896 B2 | 4/2019 | Gao et al. | |
| 10,268,860 B2 | 4/2019 | Gao | |
| 10,300,158 B2 | 5/2019 | Hardin et al. | |
| 10,475,646 B2 | 11/2019 | Miao et al. | |
| 2005/0011956 A1 | 1/2005 | Carlson | |
| 2006/0274171 A1 | 12/2006 | Wang | |
| 2018/0314863 A1* | 11/2018 | Gao | G06K 7/10831 |
| 2018/0365461 A1 | 12/2018 | Wang | |
| 2020/0380224 A1 | 12/2020 | Barkan et al. | |
| 2021/0012076 A1 | 1/2021 | Barkan et al. | |

OTHER PUBLICATIONS

Computer Vision Foundation (CVF) CVPR Paper in Open Access version identical to the version available on IEEE Xplore; "Stereo Matching with Color and Monochrome Cameras in Low-light Conditions," (http://openaccess.thecvf.com/content_cvpr_2016/papers/Jeon_Stereo_Matching_With_CVPR_2016_paper.pdf)) 2016, pp. 4086-4094.

* cited by examiner

*Primary Examiner* — Kristy A Haupt
(74) *Attorney, Agent, or Firm* — Foley & Lardner LLP

(57) ABSTRACT

A code reader and method thereof may include capturing monochrome images of a scene by a monochrome imager, and capturing color images of the scene by a color imager aligned with the monochrome imager. Stereo 3D images of the scene may be generated from the monochrome and color images.

20 Claims, 11 Drawing Sheets

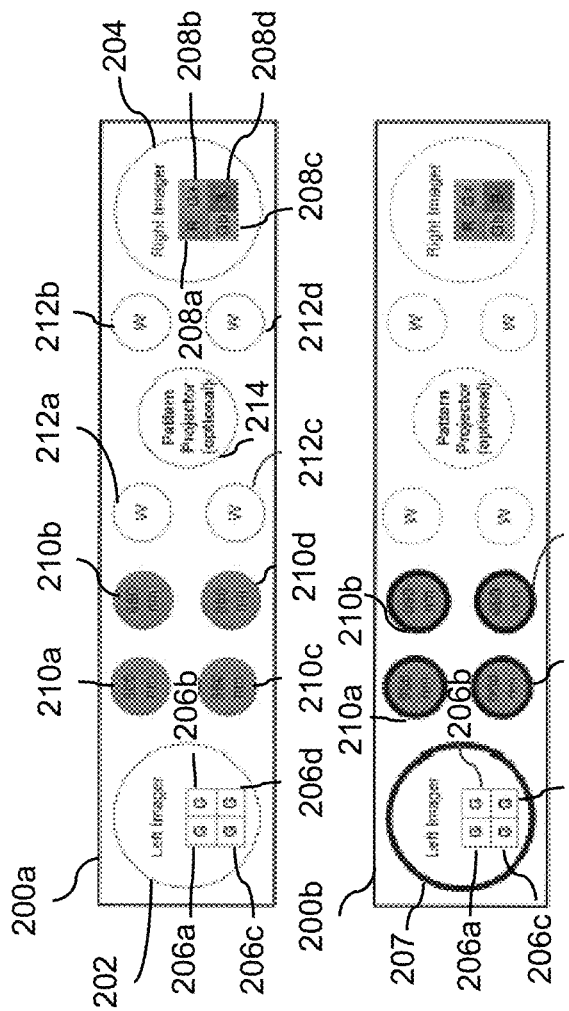
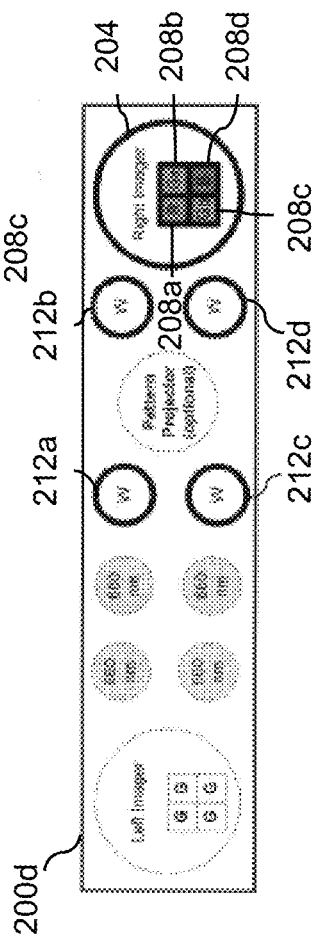
FIG. 2A  FIG. 2B  FIG. 2C  FIG. 2D

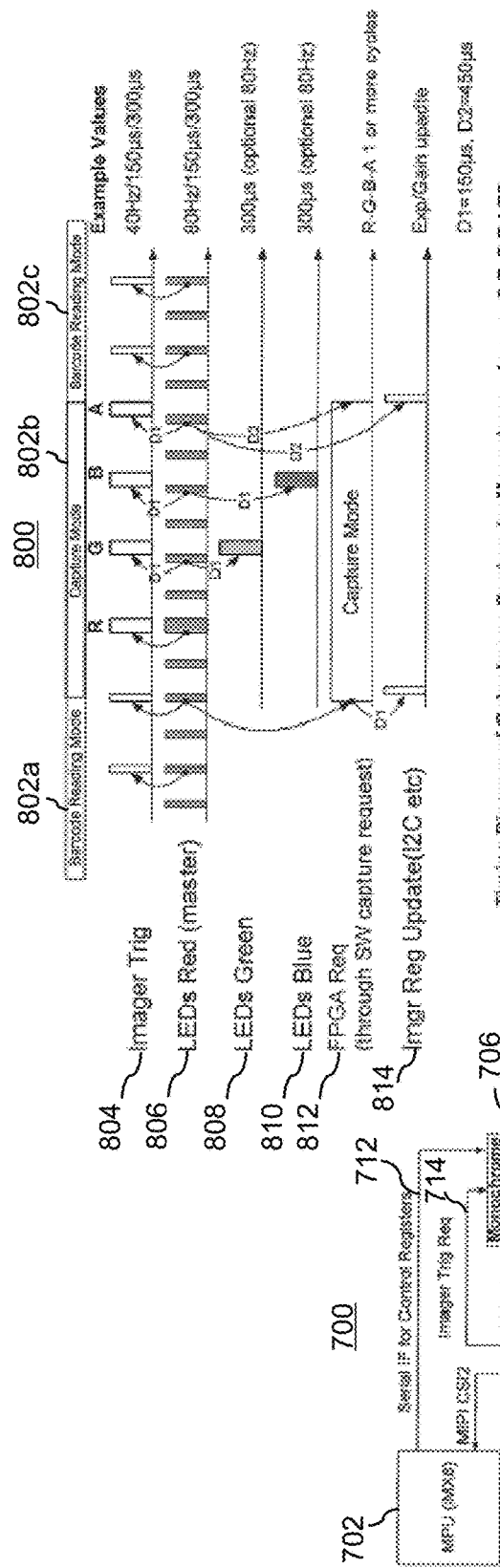
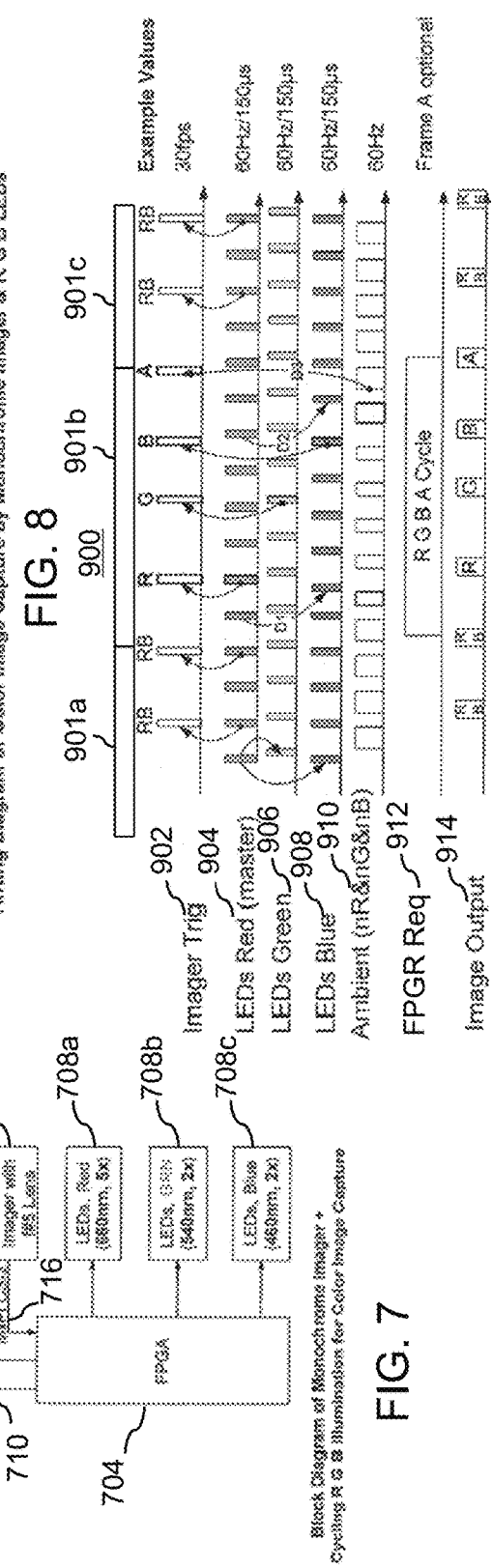
FIG. 7
FIG. 8
FIG. 9

Fig. 4 Block Diagram of Color Image Capture by Monochrome + Color Imager & Red+White LEDs

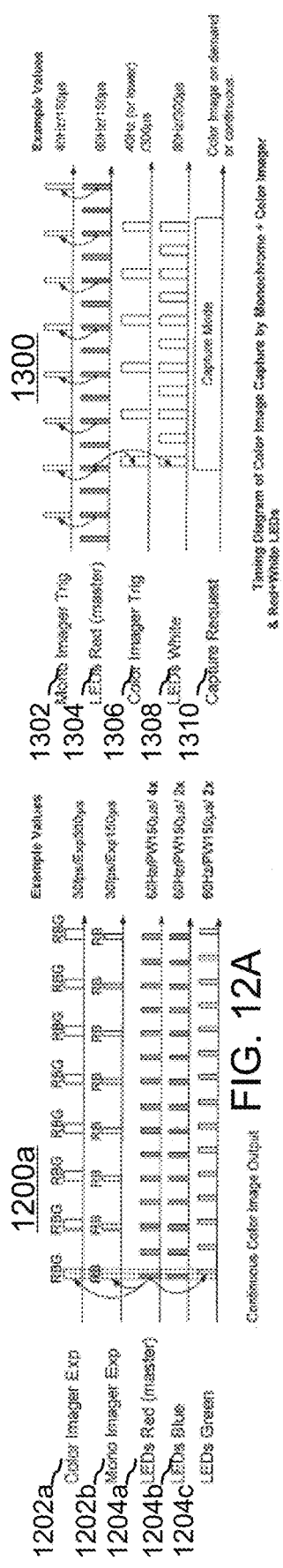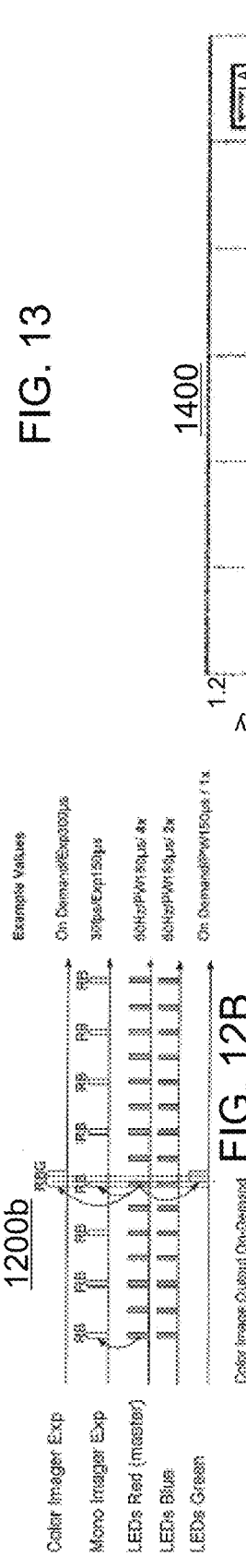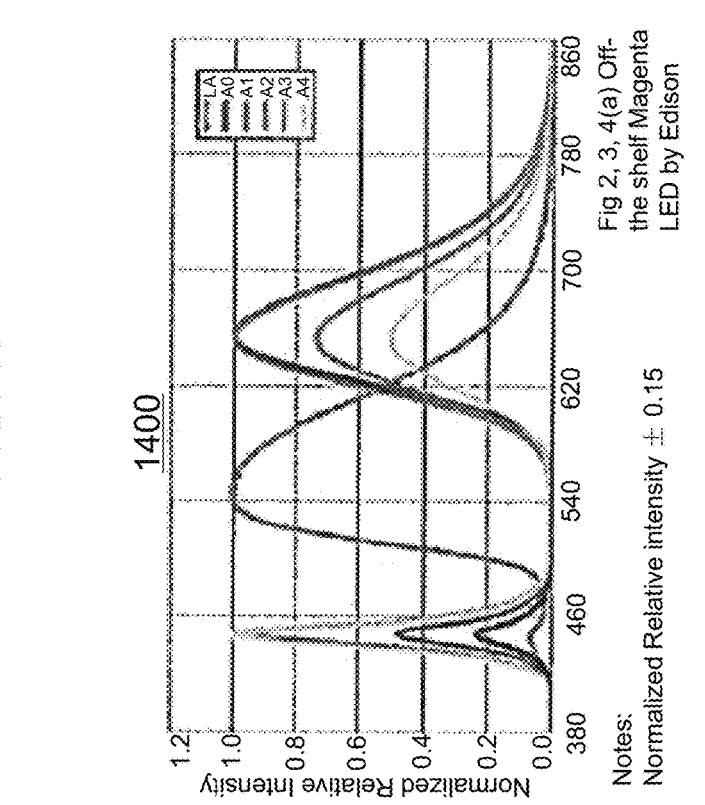
FIG. 12A
FIG. 12B
FIG. 12C
FIG. 12D
FIG. 13
FIG. 14

PRODUCE OR ITEM RECOGNITION BY HYBRID 3D CAMERA AND/OR MULTI-SPECTRUM ILLUMINATION

BACKGROUND

Grocery stores have greatly improved efficiency by the wide adoption of barcode readers that integrate with point-of-sale (POS) systems along with price look-up (PLU) databases. The efficiency has made it possible to reduce cost for grocery stores due to having fewer checkout attendants and faster checkouts for customers. One area in which efficiency still suffers is the ability for checkout attendants to process produce and various items that are not coded with machine-readable indicia (e.g., DataBar barcodes, conventional barcode, QR codes, digital watermarks, etc.). Because produce is not always readily or easily identified by checkout attendants, especially less experienced attendants, and produce is difficult or not possible to mark with a machine-readable indicia, checkout attendants are often left with having to compare the produce with photographs of possible produce to determine how much to charge for the produce being purchased via a PLU. Such an identification and look-up process is inefficient and often leads to incorrect results, such as when one type of lettuce is misidentified as a different type lettuce. In addition to being a slow process, incorrectly identifying produce and other items leads to incorrect inventory counts in the retail store, thus leading to inefficiency in ordering and potentially loss of perishable items.

Recent developments of produce identification systems have been made. However, these systems often have difficulty due to being unable to separate background from the produce and/or products. As an example, a dedicated color imager and white illumination devices may be used to capture images for produce or item recognition. Such systems include Picklist Assist by NCR, Toshiba demo by Focal Systems at NRF2019, VeggieVision by IBM, and so on. The main imaging technologies that are used to support these produce recognition systems are computer vision and machine learning. Item color is one of the main features of these technologies. Such conventional data capture technologies mainly uses a color image sensor and white illumination LEDs. White balance algorithms are mainly designed for a human's perception. However, for machine vision, useful features are physical features of items (e.g., produce) instead of human perception.

One challenge with the produce recognition systems is that the color imagers with color image sensors is that the color image sensors do not work well for scanning machine-readable indicia, which is the main function of code scanners in retail environments. Moreover, these systems generally have lower accuracy than desired due to the use of white illumination, have a higher cost, and are less power efficient. As such, there is a need for a produce and product image and recognition system that is highly accurate, low cost, power efficient, supports digital watermark codes (e.g., DWcode by Digimarc) and other machine-readable indicia, and integrates with conventional barcode reading systems used with POS systems.

BRIEF SUMMARY

A code reader with a hybrid monochrome imager and a color imager may provide for stereo 3D imaging that supports both reading machine-readable indicia and produce and product identification. Such a code reader configuration provides for imaging conventional machine-readable indicia and supports produce and product or item identification that is more accurate than existing produce and product identification systems. The stereo 3D code read has improved power efficiency, lower cost, and able to be integrated into existing code reading systems, such as top-down code readers. The use of the monochrome imager allows for reading conventional machine-readable indicia and digital watermarks, and may operate in accordance with existing code reading standards (e.g., illumination of a scene by a deep red illumination signal), while the use of a color imager supports identification of produce and other products while in stationary or non-stationary states. The monochrome imager may also be used to image a scene that is sequentially illuminated by different wavelengths of stationary items captured images of the scene illuminated by the different wavelengths may be recombined by a computer to produce a more accurate color image than possible with RGB color imagers as a de-mosaic engine is not needed. The use of a combination of the monochrome imager and color imager as a stereo 3D imager along with a pattern generator enables a point cloud of items to be produced, thereby providing for enhanced produce and item identification by performing a shape analysis. In an embodiment, the results of the various imaging and produce and item analysis techniques may be used to determine or limit a selection menu of possible items for an operator or user of a Point-of-Sale (POS).

One embodiment of a code reader may include a monochrome imager and a color imager aligned with the monochrome imager to enable a stereo 3D image of the scene to be generated by images captured by the monochrome and color imagers.

Another embodiment of a code reader may include a monochrome imager, a first illumination device configured to output a first illumination signal at a first wavelength, and a second illumination device that outputs at least one second illumination signal at a second wavelength. A control circuit may be in electrical communication with the monochrome imager, the first illumination device, and second illumination device. The control circuit may be configured to independently drive the first illumination device and second illumination device to expose the monochrome imager with the first illumination signal and second illumination signal to capture images of an item. A processor may be in communication with the control circuit and monochrome imager, and be configured to receive and produce a composite color image from the captured images illuminated by the first and second illumination signals.

One embodiment of a method may include capturing monochrome images of a scene by a monochrome imager and capturing color images of the scene by a color imager aligned with the monochrome imager. Stereo 3D images of the scene may be generated from the monochrome and color images.

BRIEF DESCRIPTION OF THE DRAWINGS

Illustrative embodiments of the present invention are described in detail below with reference to the attached drawing figures, which are incorporated by reference herein and wherein:

FIGS. 2A-2D (collectively FIG. 2) are illustrations of an illustrative configuration of a hybrid stereo 3D camera layout of a code reader and operation thereof in accordance with the principles herein;

FIG. 7 is a block diagram of an illustrative circuit of a monochrome imager using different wavelength illumination devices for use in capturing images of items to perform identification thereof;

FIG. 8 is a timing diagram of a monochrome imager and multiple color illumination devices used to illuminate a scene captured by the monochrome imager;

FIG. 9 is a timing diagram of a continuous image output though an FPGA by a micro control unit without affecting barcode and DWM reading;

FIGS. 12A-12D are timing diagrams of illustrative illumination and image capture processes for capturing continuous and on-demand color images of a scene;

FIG. 13 is a timing diagram of an illustrative color image capture process by a monochrome imager and a color imager using red and white LEDs;

FIG. 14 is a spectral diagram of illustrative wavelengths of a magenta LED for use with an embodiment of an imaging system described herein;

DETAILED DESCRIPTION OF THE DRAWINGS

Code readers are widely used in retail environments. In some cases, such as produce (e.g., grapes, apples, etc.) and items (individually and collectively "objects"), it is not possible or not consumer-acceptable to stick machine-readable indicia onto the items (e.g., produce, products, etc.) so other techniques to determine the items so as to improve productivity of operators or shoppers in completing a transaction for the items. One such technique is to perform image processing so as to automatically identify the un-coded items. However, there are some challenges that exist in imaging the items. Such challenges may include, but are not limited to:

(1) Item Color: Item color is a primary feature of object recognition algorithms. Accurate image color balance changes according to ambient light and to interaction from other illumination signals, such as red LEDs used by a code scanner. As provided herein, one solution is to use active pulsed white or multiple spectrum illumination synchronized with the scanner.

(2) Image Background: Objects other than the item itself, such as background objects (e.g., surface on which an object rests when being images) is not desired and real-time background removal is difficult. As provided herein, one solution is to use a color imager and monochrome imager pair to be able to generate a three-dimensional (3D) point cloud for localizing the object.

(3) Color Resolution: In some cases, available color resolution when using three color illumination (e.g., RGB) is not enough to separate objects with similar color signatures. As provided herein, an increase in the number of colors available for use in illuminating objects (e.g., multi-spectrum LEDs) may be used to increase the object recognition rate.

(4) Cost and Energy Efficiency: For all functions of code scanning systems, including read barcode, read digital watermark (DWcode), and color features of items, cost and energy efficiency is desirable. In an embodiment, one solution includes using a single monochrome imager and RGB LEDs for the functions (i.e., barcode reading, DWcode, and color feature recognition). Even with both color and monochrome imagers with white LEDs only, a green notch optical filter on a monochrome imager side provides good performance for DWcode reading.

Figure 1:
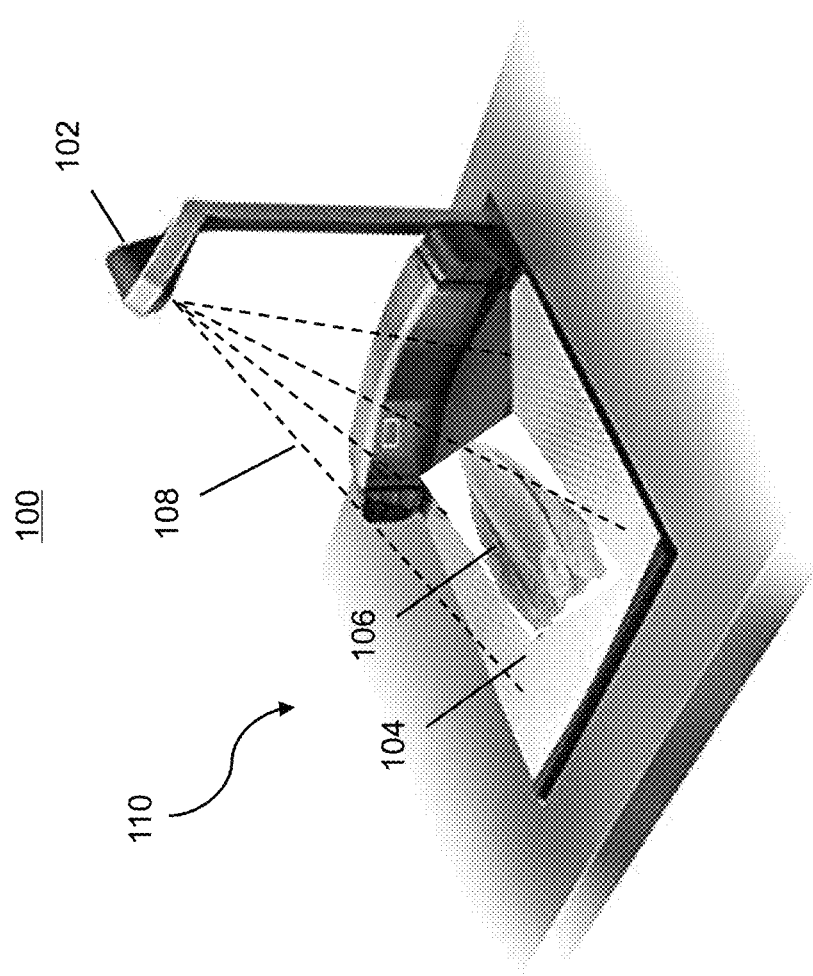
FIG. 1 is an illustration of an illustrative top-down code reader capable of reading and decoding machine-readable indicia on product labels and configured with a stereo 3D imaging system for use in automatically identifying items in accordance with the principles provided herein.

With regard to FIG. 1, an illustration of an illustrative top-down code reader system 100 capable of reading and decoding machine-readable indicia on product labels and configured with a stereo 3D imaging system for use in automatically identifying items (e.g., produce) in accordance with the principles provided herein. In an embodiment, a reader head 102 may include a pair of imagers, including a monochrome imager and a color imager (see FIG. 2A) configured in a stereo 3D configuration so as to capture 3D images of items disposed on an imaging surface 104 or otherwise being positioned within a field-of-view of the reader head 102. As an example, the produce may be lettuce 106, and the code reader system 100 may be configured to control illumination devices, such as light emitting diodes (LEDs) having different wavelengths, to output illumination signals 108 to illuminate a scene 110 at the imaging surface 104 with produce or items disposed. The monochrome imager may have a field-of-view that includes the produce/item to capture images of the produce/items scene 110 being illuminated by the different wavelengths. A processor of the system 100 may combine the captured images to form a color image that is more accurate than is possible by a color imager. The processor may process the images and assist an operator or user of the system 100 to automatically identify the produce/item captured in the images, and the system 100 may communicate information associated with the identified produce/item to a point-of-sale system (not shown) for displaying on a user interface for the user to confirm and/or select.

It should be understood that the coder reader system 100 may include additional imagers at different locations in addition to the reader head 102, such as within the horizontal platter and/or vertical bonnet to capture images for additional views of the items of a bi-optic scanner. Some embodiments may also include arrangements with different views that are desirable for self-checkout systems. Such other imagers may include monochrome imagers and/or color imagers, including hybrid pairs of imagers, as described herein. Thus, it should also be understood that embodiments of the disclosure having the monochrome imager and color imager pair are not limited to being disposed only in a top-down reader arrangement as shown in FIG. 1, but also within other arrangements of a checkout system (e.g., assisted as well as self-checkout), standalone top-down readers, hand-held readers, and other types of code readers known in the art.

With regard to FIGS. 2A-2D (collectively FIG. 2), illustrations of an illustrative configuration of a hybrid stereo 3D camera layout 200a of a code reader in accordance with the principles herein is shown. In particular, FIG. 2A shows the 3D camera layout 200a with various components, and FIGS. 2B-2C show active components (using solid lines) and non-active components (using dotted lines) for different operational modes that will be described further hereinbelow. In an embodiment, a code reader with the 3D camera layout 200a may be configured (e.g., programmed or hard wired) to be in a code reading mode, item identify mode, and specific illumination mode manually, automatically, or semi-automatically. For example, if an item is positioned within a field-of-view of the 3D camera layout 200a and a machine-readable indicia is not identified within a timer period (e.g., 2 seconds), then the code reader may automatically determine whether the item is moving or not and then initiate an item identification process. Alternative processes may be utilized, as well.

As shown in FIG. 2A, the hybrid stereo 3D camera layout 200a may include a left imager 202 and right imager 202. In an embodiment, the left imager 202 is a monochrome imager and the right imager 204 is a color imager. It should be understood that the left imager 202 may alternatively be a color imager and the right imager 202 may be a monochrome imager. That is, the layout 200a may be a mirror layout as shown, and provide the same or analogous functionality as the layout 200a, as presented.

The left imager or monochrome imager 202 may have four green or other wavelength sub-sensors 206a-206d (collectively 206) so as to form a monochrome (i.e., single color) imager, and the right imager or color imager 204 may have three colored sub-sensors, including red 208a, green 208b/208c, and blue 208d (collectively 208) sub-sensors so as to form a multi-spectral or color imager. It should be understood that alternative color sensors or locations of the color sensors may be utilized in forming the color imager. Each of the sensors 202 and 204 may be configured with quadrants of the sub-sensors 206 and 208. Alternative configurations and/or numbers of sub-sensors may be utilized in accordance with the principles described herein. For example, the configuration may be a triangular configuration with three sub-sensors. The left and right imagers 202 and 204 may include additional hardware, such as memory, analog-to-digital (A/D) converters, data storage devices, data communication devices, and/or otherwise that are not shown to convert, store, and communicate illumination data generated by the sub-sensors 206 and 208.

The layout 200a may further include a set of red illumination devices (e.g., LEDs) 210a-210d (collectively 210) that are used to illuminate a scene for the monochrome imager 202, as described with regard to FIG. 2B. As understood in the art, the red illumination devices 210 may be configured to meet barcode reading standards that are established by an industry group that defines printing, illumination, and imaging standards of machine-readable indicia. As such, the red illumination devices 210 may output specific wavelengths, such as 670+/−10 nm wavelengths, as shown. Alternative wavelengths may be utilized depending on the use and specifications of the system.

In addition, for imaging color scenes by the color imager 204, white illumination devices 212a-212d (collectively 212) may be provided. The white illumination devices 212 may be turned on to create multi-spectral lighting for the color imager 204 to collect images of items being imaged by the color imager 204, as further described with regard to FIG. 2D. A pattern projector 214, which may be optional, may be provided to illuminate the scene with a pattern of light so that a 3D image of the scene may be better determined, as described with regard to FIG. 2C.

In an embodiment, a number of image sensor pairs may be utilized, including the non-limiting pairs of image sensors provided in TABLE I:

TABLE I

| IMAGE SENSOR PAIRS | | |
|---|---|---|
| Monochrome Imager | Color Imager | Manufacturer |
| OV9282 or OV9285 (1328 × 1120) | OV9782 (1280 × 800) | OmniVision Technologies |
| OG02B1B (1600 × 1200) | OG02B10 (1600 × 1200) | OmniVision Technologies |
| AR144CSSM | AR0144CSSC | ON Semiconductor |
| EV76C560ABT-EQV | EV76C560ABT-EQV | E2V |
| AR0144CSSM | AS0142AT with (YUV output) | ON Semiconductor |

Figure 5:
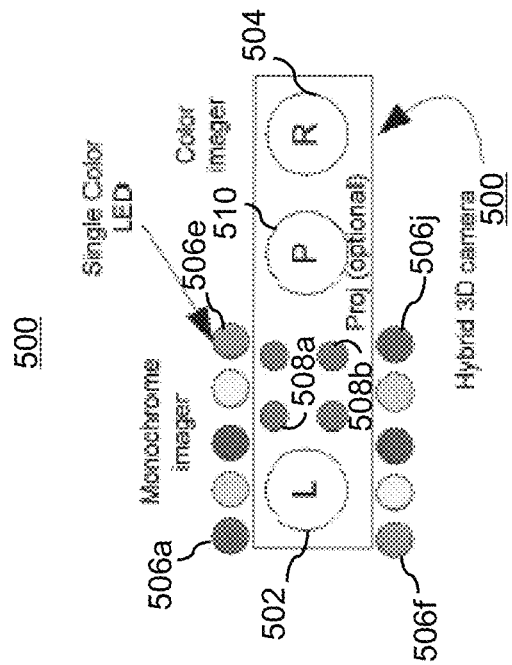
FIG. 5 is an illustration of an illustrative hybrid 3D camera including a monochrome imager and color imager.
Figure 4:
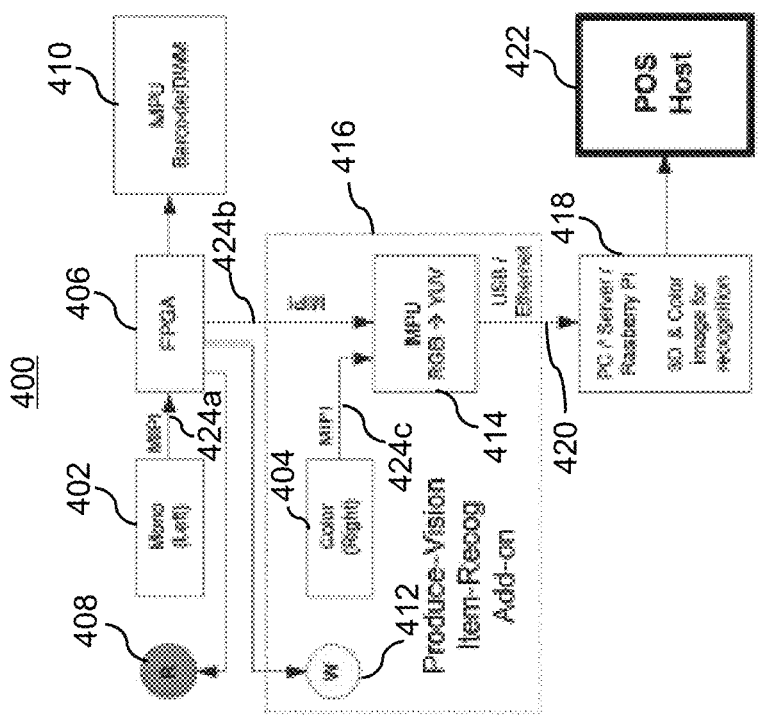
FIG. 4 is an illustration of an illustrative code reading system inclusive of an add-on module for produce and item recognition.
Figure 11:
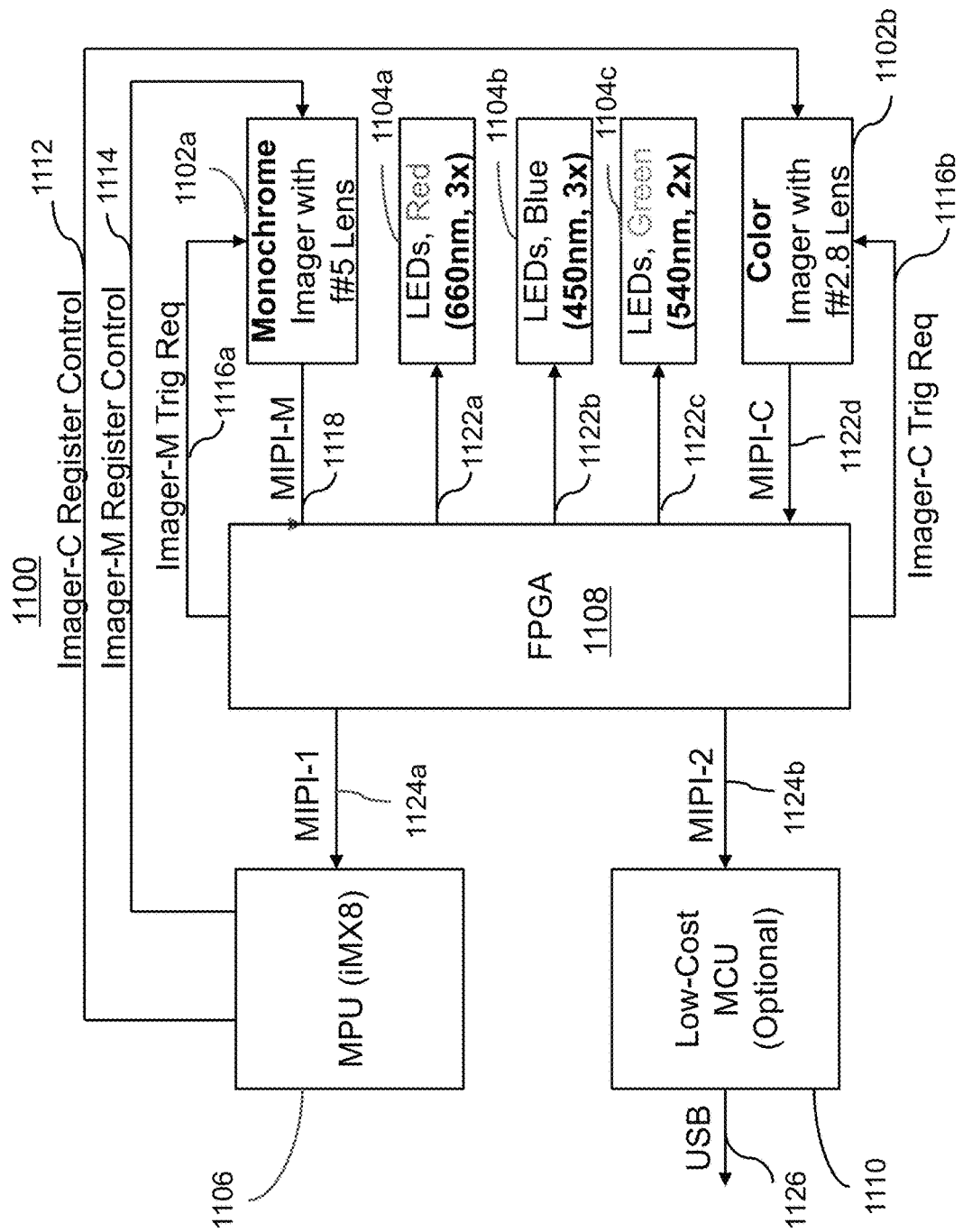
FIG. 11 is a block diagram of an illustrative circuit including a monochrome and color imager along with red, green, and blue LEDs for illuminating a scene to be captured by the imager(s)

The code reader may operate in two modes, including (i) imaging and decoding of machine-readable indicia, and (ii) performing produce and item imaging and optionally recognition. To support these functions, different configurations of the imaging system and control/processing system may be utilized. Different illustrative configurations of the imaging system are shown in FIGS. 2A and 5, and different illustrative configurations of the control/processing system are shown in FIGS. 4, 7, and 11, where the imaging and control/processing systems may be configured to operate specifically in conjunction with the respective designs (i.e., a control/processing system matches the configuration of the imaging system).

With specific regard to FIG. 2B, when the code reader is being used to perform reading of machine-readable indicia, the monochrome imager 202 is activated along with the red illumination devices 210. The remainder of the electronic devices or components, including the color imager 204, white illumination devices 212, and pattern projector 214 are inactive.

With specific regard to FIG. 2C, when the code reader is being used to perform produce and/or item recognition and a 3D image is desired to assist in determining a shape of the product and/or item, the monochrome imager 202, color imager 204, and the pattern projector 214 may be activated. It should be understood that the pattern projector 214 may be helpful by providing structured light that complex shapes, which are often found with items in grocery stores, may be determined and used to help identify the produced or item. The remainder of the electronic devices, including the red illumination devices 210 and white illumination devices 212, are inactive. Because the left and right imagers 202 and 204 are positioned to capture 3D images, the image data collected by each of the imagers may be processed together so as to generate 3D point clouds of the items being imaged by code reader.

The pattern projector 214 may be used, at least in part, to enable the code reader to assist in removing the background of the scene, in this case the work surface or scanner surface on which the items are placed for the code reader to scan and/or image the items. The code reader may be a top-down code reader. The monochrome and color imagers 202 and 204 are able to see the light pattern similarly in that intensity and location of the light pattern may be sensed in about the same manner by each of the imagers 202 and 204. For example, a pattern of light output by the pattern projector 214 may be imaged onto the work surface without any objects thereon to enable determining a baseline work surface. Thereafter, when scanning items, the pattern of light that matches the baseline background scan may be used to enable the background to be detected and eliminated from other image data to reduce image processing efforts and to improve produce and item recognition efficiency.

In generating the 3D point clouds, the system may use (i) data captured by the imagers 202 and 204 with ambient or non-ambient lighting and/or (ii) data captured by the imagers 202 and 204 with structured light produced by the pattern projector 214 and illuminated onto the produce and/or item being imaged. The 3D point clouds may be used to compare against a database of 3D point clouds inclusive of shapes of known items to assist with determining a specific produce or item or a class of produce or item. If, for example, the 3D point cloud is in the shape of a banana, for example, items that are not in the shape of a banana (e.g., apples, pears, etc.) may be eliminated from possible matches of the produce being imaged using the configuration of FIG. 2C. While 3D point clouds may be produced by the code reader in assisting in determining items, it should be understood that any other type of algorithm that may be produced to be used in determining 3D objects.

With specific regard to FIG. 2D, when the code reader is being used to perform produce and item recognition by using color, the color imager 204 and white illumination devices 212 may be activated while the other components may be inactive. The color imager 204 may be used with stationary or moving objects as a result of each of the color sub-sensors being simultaneously used to capture an image of a scene such that each of the colors of the entire scene are captured in a single frame. Color of items may be used to further distinguish one produce or item from another. For example, yellow bananas may be distinguished from green lettuce and red apples.

Figure 3:
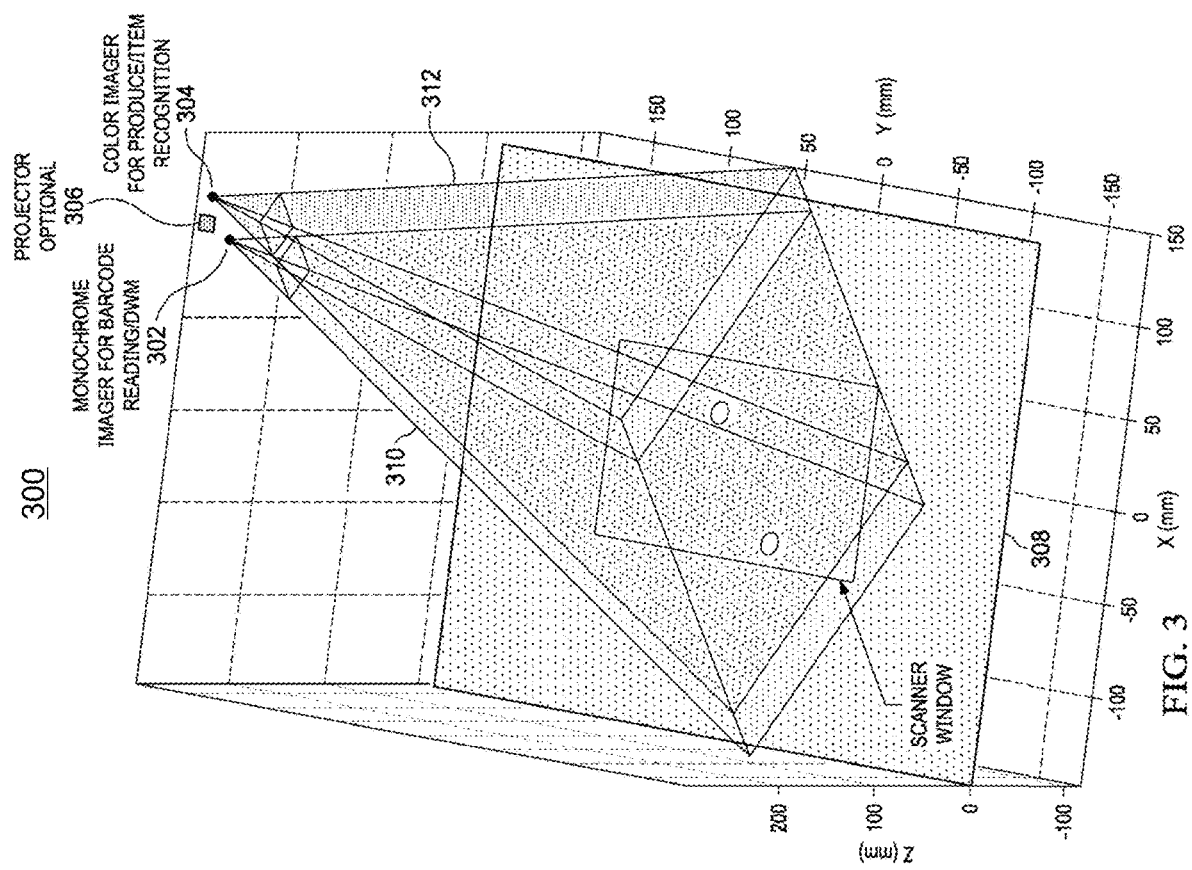
FIG. 3 is an illustration of an illustrative functional operation of a monochrome imager and color imager of the hybrid stereo 3D camera of FIG. 2.

With regard to FIG. 3, an illustration of an illustrative functional operation of a monochrome imager 302 and color imager 304 of the hybrid stereo 3D camera of FIG. 2 is shown. In an embodiment, the hybrid stereo 3D camera may be configured onto a top down code reader. The hybrid stereo 3D camera may be configured onto any other type of code reader and at any orientation in other embodiments. The imagers 302 and 304 are configured to provide for 3D image data collection of a scene at which the imagers 302 and 304 are arranged to view. In an embodiment, a projector 306 that projects structured light or a light pattern onto the scene may be included. The scene may include a scanner window 308 on which items may be placed for the imagers 302 and 304 to collect image data.

As shown, the monochrome imager may collect image data within a field-of-view defined by a monochrome image region 310, and the color imager may collect image data within a field-of-view defined by a color image region 312. The two image regions 310 and 312 are shown to be slightly offset based on the distance between the imagers 302 and 304. In operation, the projector 306 may project a light pattern onto the scanner window 308, and the imager(s) 302 and/or 304 may collect image data of the light pattern being displayed on the scanner window 308. During scanning operation of items, the background, which in this case is the scanner window 308, may be selectively removed from captured images so that the items may be processed for comparison purposes in identifying the items.

With regard to FIG. 4, an illustration of an illustrative code reading system 400 inclusive of an add-on module for produce and item recognition is shown. The system 400 may include a monochrome imager 402 and a color imager 404, which may be respectively positioned on left and right sides. An FPGA 406 may be in electric communication with the imagers 402 and 404, and be configured to control timing of components of the system 400. For example, the FPGA 406 may be configured to control operation of one or more red illumination devices 408 and cause the monochrome imager 402 to collect image data when the red illumination devices 408 are activated. A micro processing unit (MPU) 410 may be configured to perform decoding of machine-readable indicia (e.g., barcodes) and digital watermarks by receiving image data collected by the monochrome imager 402 including the machine-readable indicia and barcodes.

To provide for produce and item recognition, the color imager 404, white illumination device(s) 412, and micro processing unit 414 may be used to form a produce vision item recognition add-on circuit 416. The FPGA 406 may be in communication with the white illumination device(s) 412 to control operation thereof and be in communication with the MPU 414 to communicate data therewith. In an embodiment, the MPU 414 may be configured to transform captured color image data from an RGB data format to YUV data format, thereby enabling monochromatic image data captured by the monochrome imager 402 to be more readily processed with image data captured by the color imager 404. A computing device or system 418, such as a computer, server, or Raspberry Pi computer board may be configured to perform 3D and color image processing to perform produce and/or item recognition. The computing device 418 may be in communication with the MPU 414 via a communications channel 420, such as a USB or Ethernet communications bus. The computing device 418 may further be in communication with a point-of-sale host computer 422 so as to provide produce and/or item recognition information, such as name(s), identifier(s), and/or other information for the POS host computer 422 to add to a purchase and/or present to an operator or user for selection.

A number of internal communications paths 424a, 424b, and 424c, such as MIPI serial interfaces, may be used to enable the FPGA 406 to communicate with the monochrome imager 402 and the MPU 414, and enable the MPU to communicate with the color imager 402. It should be understood that alternative interfaces may be utilized in accordance with the principles described herein. However, the MIPI serial interface is a standard, low-cost interface that is sufficient for handling data communication as provided herein.

Because identification of items can be challenging depending on the type of produce or items, an increase in color or spectrum may extend from three wavelengths (i.e., RGB) to more than three (e.g., between 4 and 10) by using additional color illumination devices for the monochrome imager to capture when imaging a scene. With regard to FIG. 5, an illustration of an illustrative hybrid 3D camera 500 including a monochrome imager 502 and color imager 504 is shown. Color illumination devices (e.g., LEDs) 506a-506j (collectively 506) may be disposed in proximate location to the monochrome imager 502. The number color illumination devices 506 may be any number, and have distinct wavelengths such that color of a produce or item is able to be identified more easily as spectral analysis may help in distinguishing one type of produce from another, for example, over each of the distinct wavelengths. Red illumination devices 508a-508d (collectively 508) may also be provided for capturing images of machine-readable codes, as previously described. The camera 500 may also optionally include a pattern projector 510. It should be understood that alternative configurations that provide for the same or similar functionality may be provided, as well.

In operation, a 3D point cloud may be generated by collecting and processing image data generated by the monochrome and color imagers 502 and 504 arranged in the stereo 3D configuration capturing images of the scene. Thereafter, the color illumination devices 506 may be cycled one at a time and the monochrome imager 502 may capture an image of the scene while each of the respective devices 506 with the different wavelengths are illuminated. In the case of cycling the color illumination devices 506 and imaging the scene with the monochrome imager 502, the produce or item is to remain stationary since movement would result in a blurred image between successively captured image frames by the monochrome imager 502.

After calibration with the image sensors 502 and/or 504 being used so as to decouple a learning algorithm from the specific image sensor(s) so that an item model database is not sensor dependent, the regions-of-interest (ROIs) from the point clouds may be used for produce and item recognition. The learning algorithm may be performed by the computer 418 of FIG. 4, for example.

In performing a stereo 3D disparity calculation, camera intrinsic data may be saved on an imager board, and stereo calibration data may be saved on a board used by the code reader. Thereafter, image data from the monochrome imager 402 may be communicated to a recognition module executing on the computer 418. The image represented by the image data may be rectified. The image data from the color imager 404 may be communicated to the computer 418. The image data may be color de-mosaiced and converted to Y, which may be rectified. Both the monochrome images and color images are CENSUS transformed to remove the gray scale dependence for disparity matching. The color sensor and monochrome sensor may have different resolution (e.g., higher f # and better spatial resolution) and color sensor 404 may be used for 3D imaging and may have lower f # and fewer pixels. As understood in the art, a higher f # results in a smaller or narrower aperture and deeper depth-of-field, while a lower f # results in a larger or wider aperture and shallower depth-of-field. In an embodiment, the color imager may have an f # of 2.8, while the monochrome imager may have an f # of 5, which enables the monochrome imager to be used for imaging machine-readable indicia at a wider range of distances from the code reader, for example.

Feature recognition may use a visual pattern recognition (ViPR) or deep learning algorithm applied to known regions-of-interest. In the case of multiple spectrum data, more color data instead of RGB only may be available for recognition of the items.

Figure 6:
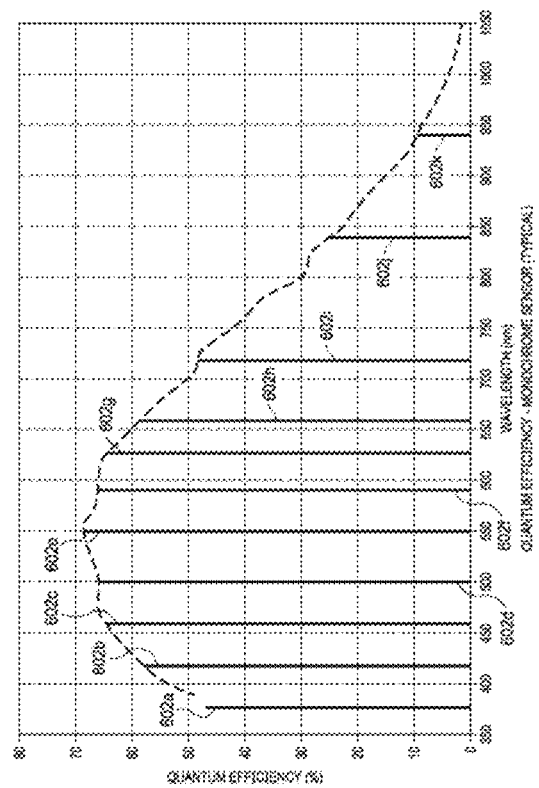
FIG. 6 is a spectrum graph of multi-spectrum illumination sources or signals by different illumination devices for use with a monochrome imager that are used to improve identification of items by a code reader using a multi-spectral analysis.

With regard to FIG. 6, a graph of an illustrative multi-spectrum illumination 600 by different wavelength illumination devices for use with a monochrome imager to improve identification of items by a code reader using a multi-spectral analysis is shown. Wavelengths 602a-602k (collectively 602) of each of the respective color illumination devices are shown on the graph. The wavelengths 602 may include 395 nm, 420 nm, 460 nm, 500 nm, 550 nm, 590 nm, 620 nm, 660 nm, 720 nm, 840 nm, and 940 nm. It should be understood that alternative number and/or wavelengths may be utilized to provide for the same or similar functionality. With further regard to FIG. 4, by including multiple MPUs 410 and 414, one dedicated to the monochrome imager 402 and one optionally dedicated to the color imager 404, it is possible to image and process color image data captured by the color imager 404 for items that are moving. If additional color content is desired, then the produce or item may be stopped from moving and the additional color illumination devices may be utilized to improve the ability to identify the produce or item.

To improve efficiency in capturing accurate color images efficiently by code readers, two non-limiting configurations and techniques may be used, including (i) a single monochrome imager that cycles through capturing images of a scene that are illuminated by red, green, and blue illumination signals, and (ii) a single monochrome imager and a single color imager that capture images of a scene that is simultaneously illuminated by red, green, and blue illumination signals. As previously described, the use of a single monochrome imager that successively cycles through different color illumination signals can be used for stationary items (e.g., produce), while a color imager that simultaneously illuminates a scene with multiple color illumination signals may be used for items in motion without resulting in blurred images of the item.

With regard to FIG. 7, a block diagram of an illustrative imaging circuit 700 of a code reader is shown. Such an imaging circuit 700 may be disposed within a code reader, such as a top-down reader of a fixed retail scanner, at one or more locations within a fixed retail scanner (e.g., bi-optic, single plane, etc.), or peripheral devices (e.g., handheld scanners, overhead scanners, etc.), or combinations thereof. The imaging circuit 700 may also be incorporated into other types of code readers (e.g., mobile computers, industrial scanners, etc.) as known in the art.

The imaging circuit 700 has a single MCU or MPU 702 that is in communication with an FPGA 704. The MPU 702 may be in communication with a monochrome imager 706 that includes an f #5 lens that provides a longer depth-of-field (DOF) than typical monochrome imagers use so as to better support cycling through different color illuminations of a scene. The FPGA 704 may be utilized to coordinate timing of the monochrome imager 706 with illumination by different colored illumination devices, including a red illumination device (e.g., LED) 708a, green illumination device 708b, and blue illumination device 708c (collectively 708). The red illumination device 708a may output an illumination signal at 660 nm, green illumination device 708b may output an illumination signal at 540 nm, and blue illumination device 708c that outputs an illumination signal at 460 nm. Alternative colors and/or wavelengths may be utilized.

The FPGA 704 may be in communication with the MPU 702 via a communications path 710, which may be an MIPI serial interface. The MPU 702 may be in communication with the monochrome imager 706 via a serial interface 712 for control registers of the monochrome imager 706. The FPGA 704 may be in communication with the monochrome imager 706 via a communication path 714 to trigger the monochrome imager 706 based on timing of the illumination devices 708.

More generally, and in operation, a code reader with the imaging circuit 700 may include the monochrome imager 706, first illumination device 708a configured to output a first illumination signal at a first wavelength, and second illumination device 708b that outputs at least one second illumination signal at a second wavelength. A control circuit, such as the FPGA 704, may be in electrical communication with the monochrome imager 706, the first illumination device 708a, and second illumination device 708b. The control circuit may be configured to independently drive the first illumination device 708a and second illumination device 708b to expose the monochrome imager 706 with the first illumination signal and second illumination signal to capture images of an item. A processor, such as the MPU 702, may be in communication with the control circuit and monochrome imager 706, and be configured to receive and produce a composite color image from the captured images illuminated by the first and second illumination signals.

The imaging circuit 700 may further include a third illumination device 708c that outputs at least one third illumination signal at a third wavelength. The control circuit may be configured to independently drive the third illumination device 708c to expose the monochrome imager with the third illumination signal to capture an image of the item. The processor may further be configured to produce a composite color image from the captured images illuminated by the first, second, and third illumination signals.

In an embodiment, the control circuit may further be configured to cause the monochrome imager 706 to capture an image with ambient light when none of the first, second, or third illumination devices 708 are actively illuminating. The processor may further be configured to offset the composite image with the image captured with ambient light. The images of the item captured with each of the first, second, and third illumination signals are to be captured with the item being in the same, stationary position.

With regard to FIG. 8, a timing diagram of an image capture process 800 for performing barcode and color image capture by a monochrome imager is shown. A number of control signals and illumination signals may be used as part of the process 800. The process 800 may have different modes, including a barcode reading mode 802a, capture mode 802b, and barcode reading mode 802c. In an embodiment, the barcode reading modes 802a and 802c are the same. The two modes 802a and 802c may be different in alternative embodiments. During the barcode reading mode 802a, a red illumination signal used to illuminate a machine-readable indicia (e.g., barcode) may illuminate a scene for a monochrome imager, such as shown in FIG. 7, to capture an image the red illuminated machine-readable indicia.

During the color image capture mode 802b, the red, green, and blue illumination signals may illuminate the scene including items in a sequential mode to enable the monochrome imager to capture image data when the different colored illumination signals are illuminating the scene. As previously described, if the different color illumination signals sequentially illuminate the scene, then the produce and/or item has to remain stationary so as to avoid blurring, and each of the illumination signals illuminate the scene distinct from one another. Monochrome images of the scene with the different color illumination signals may be captured, and a composite image (e.g., aggregate image) that includes each of the different illumination signals may be formed thereafter to form a color image.

In performing the process 800, an imager trigger control signal 804 may be used to trigger or turn on the monochrome imager. Illumination control signals 806, 808, and 810 may be used to turning ON and OFF different illumination devices, including red, green, and blue illumination devices. An FPGA request signal may be used to cause the color image capture mode 802b to occur so as to capture image data including red, green, blue, and ambient lighting conditions of a scene in which items are positioned. An imager register update may update signal 814 may be used to update exposure and gain of the imager.

In operation, a monochrome imager may be configured to sequentially capture images with the different colored illumination signals, including green, blue, red, and ambient lighting. During the ambient lighting, no active lighting illuminates the scene. A special filter may be applied to a captured ambient image with a window size of 3×3 pixels. Differences between red and ambient image data, green and ambient image data, and blue and ambient image data may be calculated. Thereafter, a calibrated color gain may be applied to the red and blue images. The result is a color image for both recognition and visual purposes. More generally, a color recovery process when using a monochrome imager may include (i) capture an ambient image (medium filter with 3×3), (ii) capture active illumination images, (iii) calculate differences of the color and ambient captured image data, and (iv) apply color gain from color calibration.

With regard to FIG. 9, a timing diagram of an alternative image capture process 900 is shown. The image capture process 900 may include a barcode reading mode 901a, image capture mode 901b, and barcode reading mode 901c. The image capture mode 901b is used to enable a monochrome imager to capture images with different color illumination of a scene for use in identifying items within the scene.

A number of signals are shown to include an imager trigger signal 902 that is used to capture images of a scene during different lighting conditions, including (i) red and blue, (ii) red, (iii) green, (iv) blue, and (v) ambient. Image or frame data at each of the lighting conditions may be processed thereafter. A red illumination control signal 904, green illumination control signal 906, and blue illuminate control signal 908 may be used to turn ON and OFF different illumination devices to illuminate the scene with different colors. An ambient illumination control signal 910, which may or may not be an actual signal, may occur when each of the red, green, and blue control signals are turned OFF such that there are no active illumination signals being illuminated onto the scene during those time periods. An FPGA request control signal 912 may define a frame during which a color image capture cycle is being performed. An image output signal 914 may be used to output image data from the imager to the FPGA or other electronic device, where the output data includes image or frame data captured during the different color illuminations that illuminated the scene. The different color illuminations may include (i) red and blue, (ii) red, (iii) green, (iv) blue, and (v) ambient illumination signals. The use of the imaging process 900 may allow for continuous image output through an FPGA by a micro control unit (MCU), which is often used as a WebCam controller, without affecting barcode and digital watermark reading by the code reader using a single monochrome imager.

Figure 10:
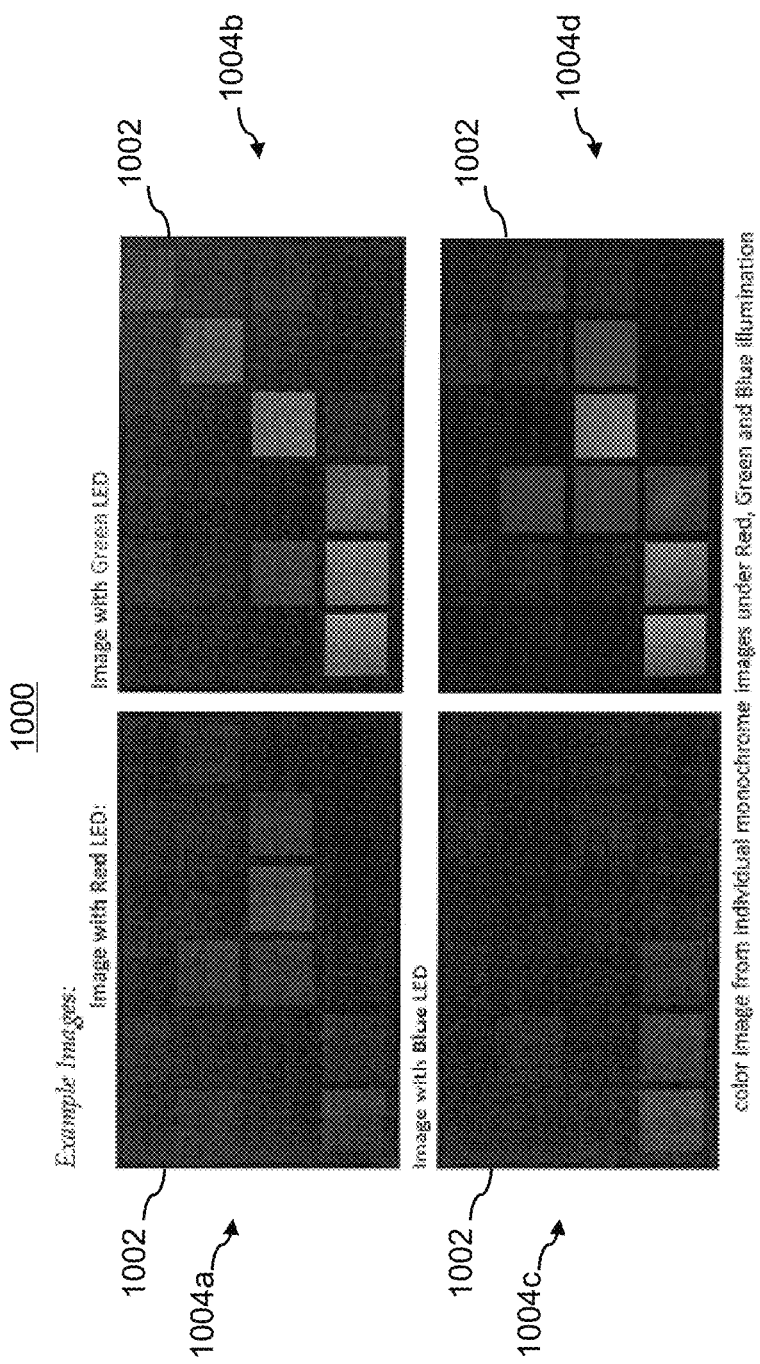
FIG. 10 shows images of illustrative color panels captured by a monochrome imager using red, green, and blue LEDs to illuminate the color panels along with a composite image produced by a combination of the captured monochrome images.

With regard to FIG. 10, a set of images 1000 including an illustrative color panel 1002 with different images, including a red illuminated image 1004a, green illuminated image 1004b, and blue illuminated image 1004c, along with a composite color image 1004d (represented in gray scale, but understood to be color produced by a combination of the captured monochrome images) is shown. Because the different colors at different wavelengths react different with the different color panels, which may include sub-portions with different colors, a monochrome imager with the same color sub-sensors may sense the color panel 1002 with different illumination intensities depending on the illumination signal being used.

In an embodiment, a color calibration may be performed. The color calibration may be performed using the following equation:

$$Vp=(Ia*R+B)+Ii \times Ri \text{ (background and signal)},$$

where Vp: pixel value,

Ia: ambient incident light on the pixel,

R: reflection of ambient light on the item corresponding to the pixel,

Ii: active illumination (i=R, G, B) incident light on the pixel, and

Ri: reflection of active illumination (i=R, G, B) on the item corresponding to the pixel.

For calibration, a gray target may be used to capture multiple images (e.g., 30 images) with only ambient illumination (i.e., no active illumination). The ambient images may then be averaged to generate an image Img1. Multiple images (e.g., 30 images) may also be captured with active illumination (e.g., R or G or B) and ambient illumination. An image difference and average of all pixels may be computed to be IcR, IcG, IcB variables that can be used to perform a color balance of the image data.

$$IcR=Img2(R)-Img1(R),$$

$$IcG=Img2(G)-Img1(G),$$

$$IcB=Img2(B)-Img1(B).$$

Using green as a reference, gain of red (GainR) and gain of Blue (GainB), so that:

IcR*GainR=IcG=IcB*GainB (color balanced), where GainR and GainB are calibrated and balanced color gain.

With regard to FIG. 11, a block diagram of an illustrative circuit 1100 including a monochrome imager 1102a and color imager 1102b (collectively 1102) along with red, green, and blue illumination devices (e.g., LEDs) 1104a, 1104b, and 1104c (collectively 1104) for illuminating a scene to be captured by the imager(s) 1102 is shown. An MPU 1106 and FPGA 1108 may be included to control functionality of the imagers 1102 and illumination devices 1104. By including the color imager 1102b, color images without motion blur may be captured. The circuit 1100 may configured to use the monochrome imager 1102a when the produce or item being scanned is stationary (e.g., on a flat scanning surface) and color imager 1102b when the produce or item is moving (e.g., on a conveyer belt). The MPU 1106 may communicate with the two imagers 1102 via communication pathways, where the MPU 1106 communicates imager-C register control signals to the color imager 1102b and imager-M register control signals 1114 to the monochrome imager 1102a. The circuit 1100 may be disposed within a code reader as previously described to decode a machine-readable indicia and/or digital watermark and/or for item identification (e.g., produce identification).

With regard to FIGS. 12A-12D, timing diagrams of illustrative illumination and image capture processes for capturing continuous and on-demand color images of a scene is shown. In being continuous, the monochrome imager and color imager is periodically exposed to capture images of a scene. FIG. 12A provides a control signal process 1200a for continuous color image output. The color imager exposure signaling 1202a is coordinated to capture images of a scene when illuminated by red, blue, and green illuminations 1204a, 1204b, and 1204c (collectively 1204), as shown. The monochrome imager exposure signaling 1202b is coordinated to capture images of the scene when illuminated by red and blue illuminations 1204a and 1204b. The exposure of the color imager is longer than the monochrome imager as the red and blue illuminations 1204a and 1204b are aligned with one another and ON for 150 μs and the green illumination 1204c is turned ON for 150 μs after the red and blue illuminations 1204a and 1204b are turned OFF. The timing of the red and blue illuminations 1204a and 1204b may be continuous with the green illumination 1204c. It should be understood that the duration of the illuminations 1204 may be different than for 150 μs.

FIG. 12B provides a control signal process 1200b for color image output on-demand. In this process 1200b, rather than the color imager being periodically exposed to the scene, the color imager is controlled to turn ON in an on-demand manner such that the color imager may be controlled to be turned ON at any time in coordination with the illumination devices.

FIG. 12C provides a control signal process 1200c for color image output on-demand with only red for barcode and digital watermark reading. In this process 1200c, rather than the monochrome imager being periodically exposed to the scene with red and blue illumination signals, the monochrome imager captures the scene with only red illumination signals. The color imager is exposed in an on-demand manner as was performed in FIG. 12B.

FIG. 12D provides a control signal process 1200d for color image output on-demand with only magenta for barcode and digital watermark reading. In this process 1200c, rather than the monochrome imager being periodically exposed to the scene with red illumination signals, a magenta light source (e.g., magenta LED) may be used such that the monochrome imager captures the scene with only magenta illumination signals. The color imager is exposed to capture an image of the scene in an on-demand manner as was performed in FIG. 12B. The magenta LED may be an off-the-shelf magenta LED produced by Edison, and, as shown in FIG. 14, and have spectral characteristics 1400 as provided by blue and red LEDs. By using magenta, only two illumination devices, a magenta LED and a green LED, may be utilized, thereby saving cost of components and assembly.

With regard to FIG. 13, a timing diagram of an illustrative process 1300 that includes color image capture by a monochrome imager and a color imager using red and white LEDs is shown. In this process 1300, a monochromatic image trigger 1302 may be used to cause the monochrome imager to turn ON while a red illumination signal 1304 is ON so that a scene in which a machine-readable indicia is located is illuminated by the red illumination. A color imager trigger signal 1306 may be turned ON to cause a color imager to capture an image of a scene when a white illumination signal causes a white LED to be turned ON. A capture request signal 1310 may cause the color imager to be selectively turned ON in response to the color imager trigger signal 1306. It should be understood that the color imager may be controlled in an on-demand or continuous (e.g., periodic) manner.

Figures 15, 16:
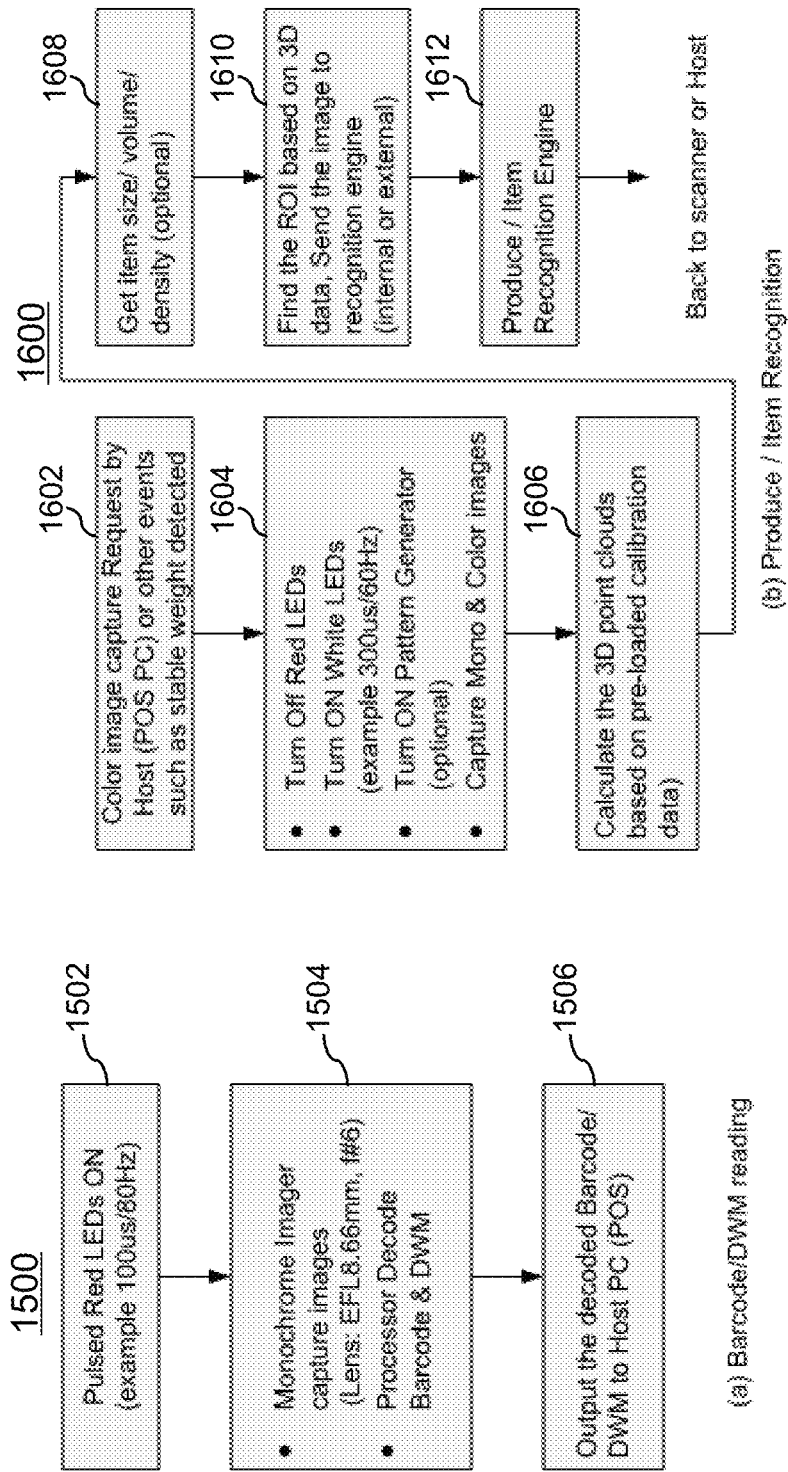
FIG. 15 is a flow diagram of an illustrative barcode and DWM imaging process.
FIG. 16 is a flow diagram of an illustrative produce and item recognition process.

With regard to FIG. 15, a flow diagram of an illustrative barcode and DWM imaging process 1500 is shown. The process 1500 may start at step 1502, where one or more red LEDs may be pulsed ON (e.g., 100 μs pulses at 80 Hz). At 1504, a monochrome imager may capture images of a scene when illuminated by the red LED(s). In an embodiment, a lens for the monochrome imager may be EFL8.66 mm, f #6. In response to the monochrome imager capturing an image while the red LED is illuminating the scene, a processor may decode a machine-readable indicia and/or digital watermark, as understood in the art. At step 1506, the decoded machine-readable indicia and/or digital watermark may be output to a host computer, such as a point-of-sale (POS) computer, for use thereby. For example, the POS computer may apply a cost to an identifier associated with the decoded machine-readable indicia and/or digital watermark.

With regard to FIG. 16, a flow diagram of an illustrative produce and item recognition process 1600 is shown. The process 1600 may start at step 1602, where a color image capture request may be made by a host (POS computer) or in response to other events, such as stable weight detected. At step 1604, (i) one more red LEDs may be turned OFF to avoid impacting a color image of a scene, and (ii) one or more white LEDs may be turned ON to fill the scene with multi-spectral illumination. In an embodiment, a pattern generator may optionally be turned ON to help with capturing a more accurate representation of a shape of produce and/or item along with helping to eliminate a background (e.g., surface on which produce and/or item is positioned). Additionally, a code reader may capture monochrome and/or color images of a scene being illuminated by the white LEDs, and, optionally, pattern generator. The pattern generator may be turned ON while the white LEDs are turned ON. In an alternative embodiment, the pattern generator may be turned ON while the white LEDs are in an OFF state. In an embodiment, the pattern generator may have a wavelength that is not on a spectral peak of the white LEDs to enable a processor to more easily distinguish a light pattern being displayed by the pattern generator from the illumination of the white LEDs.

At step 1606, a 3D point cloud may be calculated based on pre-loaded calibration data. As understood in the art, a point cloud is a set of points that define external surfaces of an object. At step 1608, item size, volume, and/or density may be determined. In determining the size, volume, and/or density, the 3D point cloud data may be analyzed, as understood in the art. At step 1610, a region-of-interest (ROI) (e.g., set(s) of data within a coordinate system) based on the 3D data may be identified and sent to a recognition engine that is internal or external from a computer on which the process 1600 is being performed. At step 1612, the ROI may be communicated to a produce/item recognition engine to determine or estimate a produce or item that is being imaged. In determining the produce or item, a learning algorithm (e.g., neural network) may be used to calculate a certainty value, and one or more produce or item possibilities that match the 3D data based on the certainty value may be presented to an operator for selection thereby via a scanner or host computer.

Figure 17:
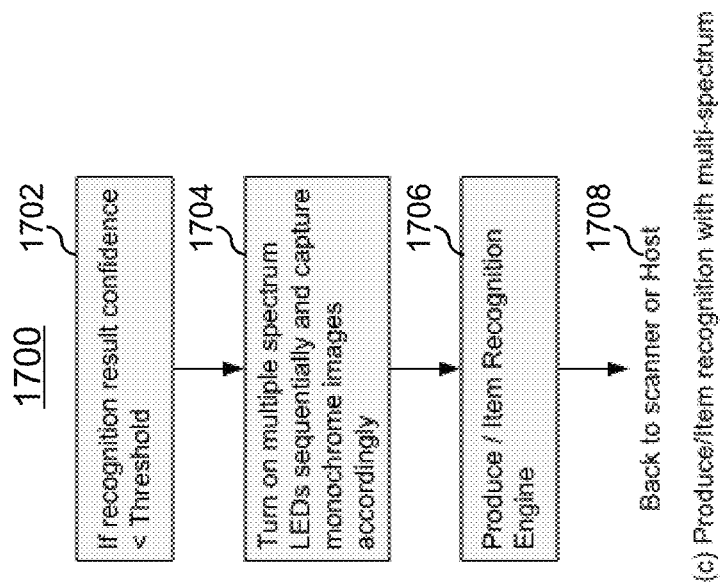
FIG. 17 is a flow diagram of an illustrative produce and item recognition process using multi-spectral analysis.

With regard to FIG. 17, a flow diagram of an illustrative produce and item recognition process 1700 using multi-spectral analysis is shown. The process 1700 may start at step 1702, where a determination may be made if confidence of a recognition result is less than a threshold. If so, then at step 1704, multiple spectrum LEDs may be sequentially turned ON, and monochrome images may be captured accordingly. At step 1706, the captured monochrome images may be used in recognizing or identifying produce or an item that is being imaged by a produce/item recognition engine. The captured monochrome images may be processed into an composite monochrome image with color information as previously described, and that composite monochrome image may be provided to the produce/item recognition engine. The identified produce or item(s) may be communicated back to a scanner or host for use thereby (e.g., add to purchase invoice, display on an interface, enable selection by an operator, etc.).

One embodiment of a process of a code reader may include capturing monochrome images of a scene by a monochrome imager. Color images of the scene may be captured by a color imager aligned with the monochrome imager. Stereo 3D images of the scene may be generated from the monochrome and color images.

The process may further include illuminating the scene in which items with machine-readable indicia are to be positioned for reading with illumination signals of different wavelengths. Monochrome images may be captured while illuminating the scene with successive illumination signals with different wavelengths.

In an embodiment, a probability of an identity of an item may be calculated based on the stereo 3D image. In response to determining that the probability is below a threshold, the successive images may be captured while illuminating the scene with successive illumination signals with different wavelengths to improve the probability of identifying the item.

The scene may be illuminated with illumination signals having a common wavelength. A monochromatic image may be captured while illuminating the scene with the second set of illumination devices. It should be understood that a common wavelength may be a range of wavelengths, but have a single peak wavelength.

The scene may be illuminated with illumination signals having common wavelengths. A color image may be captured while illuminating the scene with the illumination signals. It should be understood that common wavelengths include a range of wavelengths with multiple peaks of wavelengths.

One embodiment may include capturing corresponding monochrome images and color images. A stereo 3D image of the scene may be generated using the corresponding monochrome and color images. A point cloud based on the stereo 3D image may be generated.

In an embodiment, a light pattern may be illuminated on the scene. A monochrome image and color image may be captured when the light pattern is being projected. The stereo 3D image of the scene including the light pattern may be generated.

A background surface of the scene in the stereo 3D image may be removed. In an embodiment, a red illumination signal may be illuminated onto the scene to read machine-readable indicia by the monochrome imager. The captured images may be processed to produce a composite image with color information from each of the respective captured images of the scene being illuminated with the different wavelengths.

Another method of imaging a scene including produce or items may include illuminating, over a first time period, the scene with a first illumination signal. A first monochromatic image of the scene being illuminated by the first illumination signal may be captured. The scene may be illuminated over at least one second time period with at least one second illumination signal with at least one second wavelength. During the second time period, at least one second monochromatic image of the scene being illuminated by the at least one second illumination signal may be captured. A color image may be generated by combining the first and at least one second monochromatic images.

Illuminating over at least one second time period may include illuminating, over a second time period, the scene with a second illumination signal with a second wavelength.

The scene may be illuminated, over a third time period, with a third illumination signal with a third wavelength. Capturing, during the at least one second time period, a second monochromatic image may include (i) capturing, during the second time period, a second monochromatic image of the scene being illuminated by the second illumination signal, and (ii) capturing, during the third time period, a third monochromatic image of the scene being captured by the third illumination signal.

In an embodiment, a third monochromatic image of the scene illuminated with ambient light may be captured over a third time period. The color image may be calibrated using the third monochromatic image.

The scene being illuminated over at least one second time period with at least one second illumination signal with at least one second wavelength may include illuminating, over at least four second time periods, the scene with at least four second illumination signals with at least four second respective wavelengths. Capturing, during at least one second time period, at least one second monochromatic image of the scene may include capturing, during at least four second time periods, at least four monochromatic images of the scene.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of a preferred embodiment for implementing the invention, and the scope of the invention should not necessarily be limited by this description. The scope of the present invention is instead defined by the following claims.

What is claimed is:

1. A code reader having a hybrid camera, comprising:
  a monochrome imager;
  a color imager aligned with the monochrome imager to enable a stereo 3D image of the scene to be generated by images captured by the monochrome imager and color imager; and
  a control circuit operably coupled to the monochrome imager and the color imager, the control circuit configured to operate in different modes including:
    controlling operation of the monochrome imager to perform reading of a machine-readable indicia while the color imager is inactive;
    controlling operation of the color imager to perform item recognition of an item in the scene while the monochrome imager is inactive; and
    controlling operation of the monochrome imager and the color imager to be active together to generate the stereo 3D image to determine a 3D characteristic of the item.

2. The code reader according to claim 1, further comprising:
a first set of illumination devices configured to output illumination signals at least a first wavelength; and
a second set of illumination devices configured to output illumination signals with at least a second wavelength that is different than the first wavelength; and
wherein the control circuit is configured to:
cause the color imager to capture an image while illuminating the scene with the first set of illumination devices;
cause the monochrome imager to capture an image while illuminating the scene with the second set of illumination devices; and
cause the color imager and the monochrome imager to capture images together to generate the stereo 3D image while the first set of illumination devices and the second set of illumination devices are not active.

3. The code reader according to claim 2, further comprising a pattern generator configured to illuminate a structured light pattern on the scene, and wherein the control circuit is further configured to cause the monochrome imager and the color imager to capture the stereo 3D image of the scene when the pattern generator is projecting the structured light pattern.

4. The code reader according to claim 2, wherein the output illumination signals of the first set of illumination devices includes a white color, and the output illumination signals of the second set of illumination devices includes a red illumination signal.

5. The code reader according to claim 1, further comprising a processor further configured to remove a background surface in the stereo 3D image.

6. The code reader according to claim 1, further comprising a processor configured to process the captured images to produce a composite color image with color information aggregated from each of the respective captured images by the monochrome imager of the scene being illuminated with the different wavelengths.

7. The code reader according to claim 1, wherein the monochrome imager and the color imager have different resolutions.

8. The code reader according to claim 1, wherein exposure of the color imager is longer than exposure of the monochrome imager.

9. The code reader according to claim 1, wherein the item is a produce item.

10. The code reader according to claim 1, wherein the hybrid camera including the monochrome imager and the color imager is incorporated into at least one of a top-down reader or an overhead camera of a fixed retail scanner.

11. The code reader according to claim 1, wherein the hybrid camera including the monochrome imager and the color imager is incorporated into a bi-optic fixed retail scanner or a single plane fixed retail scanner.

12. A code reader comprising:
a monochrome imager;
a color imager aligned with the monochrome imager to enable a stereo 3D image of the scene to be generated by images captured by the monochrome imager and color imager when activated together;
a first set of illumination devices including at least three illumination devices configured to output illumination signals with different wavelengths, and configured to illuminate a scene in which items with machine-readable indicia are to be positioned for reading;
a control circuit configured to control operation of the monochrome imager and at least three illumination devices to cause the monochrome imager to capture images while illuminating the scene with successive illumination signals with different wavelengths; and
a processor configured to:
calculate a probability of an identity of an item based on the stereo 3D image; and
in response to determining that the probability is below a threshold, cause the control circuit to activate the monochrome imager to capture the successive images while illuminating the scene with successive illumination signals with different wavelengths to improve the probability of identifying the item.

13. A method, comprising:
capturing monochrome images of a scene by a monochrome imager while a color imager aligned with the monochrome imager is inactive for reading a machine-readable indicia of an item in the scene; and
capturing color images of the scene by the color imager while the monochrome imager is inactive for item recognition of the item; and
generating stereo 3D images of the scene from the monochrome and color images captured when both the monochrome imager and the color imager are active for determining a 3D characteristic of an item in the scene.

14. The method according to claim 13, further comprising:
illuminating the scene in which items with machine-readable indicia are to be positioned for reading with illumination signals of different wavelengths; and
capturing monochrome images while illuminating the scene with successive illumination signals with different wavelengths.

15. The method according to claim 14, further comprising:
calculating a probability of an identity of an item based on the stereo 3D image; and
in response to determining that the probability is below a threshold, capturing the monochrome images while illuminating the scene with successive illumination signals with different wavelengths to improve the probability of identifying the item.

16. The method according to claim 13, further comprising:
illuminating a light pattern on the scene;
capturing a monochrome image and a color image when the light pattern is being projected; and
generating the stereo 3D image of the scene including the light pattern from the monochrome and the color image.

17. The method according to claim 13, further comprising processing the captured images to produce a composite color image with color information aggregated from each of the respective captured images by the monochrome imager when the scene is illuminated with the different wavelengths.

18. The method according to claim 13, further comprising transforming captured color image data from the color imager from a color data format to a monochrome data format prior to generating stereo 3D images of the scene from the monochrome and color images.

19. The method according to claim 13, further comprising performing a 3D disparity calculation using camera intrinsic data and stereo calibration data stored within the code reader.

20. The method according to claim 13, further comprising color de-mosaicing the color images used for the stereo 3D images and removing gray scale dependence from both monochrome images and color images used for the stereo 3D images.

* * * * *